United States Patent
Wesline et al.

(10) Patent No.: US 7,065,809 B1
(45) Date of Patent: Jun. 27, 2006

(54) RECESSED CUSHION ORNAMENT

(75) Inventors: Scott Michael Wesline, Menomonee Falls, WI (US); Ronald James Priem, Slinger, WI (US); Terrence Michael Boyle, Wauwatosa, WI (US)

(73) Assignee: Milsco Manufacturing Company, Milwaukee, WI (US)

( * ) Notice: Subject to any disclaimer, the term of this patent is extended or adjusted under 35 U.S.C. 154(b) by 0 days.

(21) Appl. No.: 10/431,185

(22) Filed: May 7, 2003

(51) Int. Cl.
*A47C 31/02* (2006.01)
*A44B 1/04* (2006.01)

(52) U.S. Cl. .......................................... 5/408; 24/90.1
(58) Field of Classification Search ............ 297/452.6, 297/452.58; 24/90.1, 114.3, 102 T; 5/356, 5/408, 409, 410
See application file for complete search history.

(56) References Cited

U.S. PATENT DOCUMENTS

| | | | |
|---|---|---|---|
| 3,266,066 A * | 8/1966 | Bereday ................. | 297/452.1 |
| 3,591,876 A * | 7/1971 | Swindlehurst ......... | 297/452.52 |
| 3,708,367 A * | 1/1973 | Grant et al. ................ | 156/267 |
| 3,856,353 A * | 12/1974 | Morrison et al. ...... | 297/452.56 |
| 3,942,224 A | 3/1976 | Benmax | |
| 3,972,093 A | 8/1976 | Aimar | |
| 4,012,812 A | 3/1977 | Black | |
| 4,021,889 A | 5/1977 | Benmax | |
| 4,037,296 A | 7/1977 | White et al. | |
| 4,040,881 A | 8/1977 | Wallace | |
| 4,044,412 A | 8/1977 | Barron | |
| 4,080,675 A | 3/1978 | Kanowsky et al. | |
| 4,123,825 A | 11/1978 | Messler et al. | |
| 4,125,285 A * | 11/1978 | Hanagan ................ | 297/195.12 |
| 4,156,544 A | 5/1979 | Swenson et al. | |
| 4,158,251 A | 6/1979 | Howell | |
| 4,190,697 A | 2/1980 | Ahrens | |
| 4,204,825 A | 5/1980 | Furnas | |
| 4,283,815 A | 8/1981 | Henshaw | |
| 4,405,681 A | 9/1983 | McEvoy | |
| 4,452,488 A | 6/1984 | Rugienius | |
| 4,521,970 A | 6/1985 | Jester | |
| 4,570,306 A | 2/1986 | Eyler | |
| 4,577,373 A | 3/1986 | Bush | |
| 4,647,109 A | 3/1987 | Christophersen et al. | |
| 4,679,851 A | 7/1987 | Solie et al. | |
| 4,691,416 A | 9/1987 | Nakayama et al. | |
| 4,709,963 A | 12/1987 | Uecker et al. | |
| 4,726,086 A | 2/1988 | McEvoy | |
| 4,755,411 A | 7/1988 | Wing et al. | |
| 4,776,636 A | 10/1988 | Pyle et al. | |
| 4,836,609 A | 6/1989 | Hill | |

(Continued)

*Primary Examiner*—Peter M. Cuomo
*Assistant Examiner*—Sarah B. McPartlin
(74) *Attorney, Agent, or Firm*—Boyle, Fredrickson, Newholm, Stein & Gratz, S.C.

(57) ABSTRACT

A cushion including any number of upholstery ornaments positioned in recessed and non-rotatable locations on the cushion is provided. The cushion filler is formed of a soft, flexible and relatively low-stiffness foam material that includes one or more inserts formed of a flexible, relatively high-stiffness material and has one or more rigid securing plates secured to the cushion filler. An upholstery cover including holes or recesses and holes aligned with openings in the inserts is placed over the cushion filler and secured to a suitable base or frame. The ornaments are positioned in the holes in the upholstery cover and openings in the inserts which provide recesses in the upper surface of the cushion into which the ornaments can be drawn and secured to the rigid securing plates to provide a recessed, non-rotating and aesthetically pleasing appearance to the cushion.

26 Claims, 6 Drawing Sheets

U.S. PATENT DOCUMENTS

| | | |
|---|---|---|
| 4,838,514 A | 6/1989 | Hill |
| D308,605 S | 6/1990 | Uecker et al. |
| 5,214,811 A | 6/1993 | Priem |
| D342,850 S | 1/1994 | Slicker et al. |
| 5,293,670 A | 3/1994 | Watanabe |
| 5,302,001 A * | 4/1994 | van Dis .................. 297/228.13 |
| 5,309,612 A | 5/1994 | Briere et al. |
| 5,429,852 A * | 7/1995 | Quinn ......................... 428/71 |
| 5,498,381 A | 3/1996 | Lorbiecki et al. |
| 5,522,645 A | 6/1996 | Dahlbacka |
| 5,599,069 A | 2/1997 | Lorbiecki |
| 5,972,149 A | 10/1999 | Schiller et al. |
| 6,059,369 A * | 5/2000 | Bateson et al. ......... 297/452.18 |
| 6,120,100 A * | 9/2000 | Palazzolo et al. ............ 297/391 |
| 6,170,135 B1 | 1/2001 | Pferdehirt |
| 6,546,578 B1 * | 4/2003 | Steinmeier ...................... 5/653 |
| 6,848,156 B1 * | 2/2005 | Hanagan et al. ............. 29/91.1 |

* cited by examiner

RECESSED CUSHION ORNAMENT

BACKGROUND OF THE INVENTION

1. Field of the Invention

The present invention relates generally to vehicle seat and backrest cushions, and more specifically to cushions having upholstery ornaments or buttons secured to the cushion in a recessed and non-rotatable position within inserts positioned in the interior of the cushion in order to provide an aesthetically pleasing and generally seamless appearance to the cushion.

2. Discussion of the Related Art

To comfortably position an individual on a seat, including an operator driving or resting on a motor vehicle, such as a motorcycle, the operator rests on a cushion or backrest fixed to the seat. With most seats, both in motor vehicles and other non-motorized applications, and with motorcycles in particular, because the cushions are easily visible on the vehicle, it is desirable to provide the vehicle with cushions having an aesthetic appearance that compliments the overall appearance of the vehicle. Further, while a pleasing aesthetic appearance is desired, any features incorporated into the cushions to provide this appearance must be durable and must not detract from the ability of the cushion to provide a useful and comfortable surface for either an operator of the vehicle or a passenger on which to sit or lean against.

One aesthetic feature which has been incorporated in many prior art cushions is an upholstery ornament including a head positioned on an exposed surface of the cushion and a stem extending from the head into the cushion. The stem of the ornament is engaged by a retainer disposed within or below the cushion in order to hold the ornament on the cushion. In many prior art seat and ornament configurations, the ornament rests on the top of the cushion such that the head of the ornament protrudes outwardly from the upper surface of the cushion. Problems with this configuration arise in that items, such as clothing, can be caught on the exposed head of the ornament, which can either tear the clothing or inadvertently pull the ornament off of the cushion.

Other cushion designs pull the head of the ornament downwardly into the upper surface of the cushion in order to prevent the ornament from being snagged on clothing or inadvertently disengaged from the seat cushion. However, by pulling the ornament downwardly into the upper surface of the cushion, the cushion is compressed around the ornament, giving the upper surface of the cushion a wrinkled or rumpled appearance, detracting from the aesthetic appearance of the cushion.

As a result, it is desirable to develop a cushion and upholstery ornament for the cushion, as well as a method of forming the cushion and securing the ornament to the cushion in a manner which positions the ornament in a recessed position on the cushion to prevent items from being caught on the ornament, and also to maintain a smooth and unwrinkled appearance to the exposed upper surface of the cushion. It is also desirable to form the cushion and ornament such that the ornament cannot be rotated with respect to the cushion, allowing oblong or shaped ornaments to remain in their intended orientation, and thereby further reducing the chance that the ornament will become inadvertently disengaged from the cushion.

SUMMARY OF THE INVENTION

According to one aspect of the present invention, a cushion is provided with a number of upholstery ornaments which are secured to the cushion in a manner which locates the ornaments in a recessed and non-rotatable position on the cushion. The cushion includes a number of inserts formed of a high-stiffness material, each of which has a number of openings extending through the inserts. The inserts are positioned within a mold and integrally formed within a low-stiffness cushion filler in order to form the body of the cushion. Other more rigid support blocks can also be positioned in the mold for the cushion filler along with the inserts to provide the desired shape and consistency for the cushion filler at each section of the cushion filler.

According to another aspect of the present invention, simultaneously as the cushion filler is formed around the inserts, a number of securing plates are affixed to the cushion filler opposite the inserts, each plate having a number of openings extending therethrough that are positioned in alignment with the openings formed in each insert. The securing plates can be attached or foamed in place on the cushion filler at the same time that the inserts are positioned within the cushion filler, or can be attached in a separate step.

According to still another aspect of the present invention, an upholstery cover is then secured around the cushion filler to provide the desired exterior surface and appearance for the cushion. The cover can be formed of a water resistant or waterproof material and can also be formed as an integral piece, or by a number of separate pieces of the material secured to one another, such as by stitching. The cover includes a number of shaped recesses formed in one or more pieces of the cover under which are positioned reinforcing elements formed of the same material used to form the cover. The shaped recesses and reinforcing elements are each formed to include a central hole and the reinforcing elements are sealed to the recesses on the cover to maintain the reinforcing elements in connection with the cover. The shaped recesses, the holes in the shaped recesses and the reinforcing elements are formed in a single operation at the same time as the reinforcing elements are sealed to the cover material. The placement of the recesses and reinforcing elements on the cover corresponds to the positioning of the openings in each of the inserts, such that the recesses, reinforcing elements and holes in the recesses and reinforcing elements are aligned with the openings in the inserts and the securing plates when the cover is secured over the cushion filler.

According to a further aspect of the present invention, a number of upholstery ornaments can be affixed to the cushion within the openings in the inserts. Each ornament includes a head shaped similarly to the openings in the inserts and a stem extending outwardly from the head. The head includes a number of securing members spaced from the stem and engageable with the plug to assist the inserts in preventing the ornament from rotating. The stem includes a slot used to secure one end of an anchor to the ornament and a tapered end opposite the head to ease the insertion of the ornaments into the cushion.

In one of a number of suitable methods, the ornaments are secured to the seat cushion by a tool inserted through the openings in the securing plates, through the cushion filler, and through the openings in the insert, the recesses and the reinforcing elements, and is engaged with the anchor opposite the stem on each upholstery ornament. The tool then draws the anchor through the entirety of the cushion, consequently pulling the ornament into the opening in the insert. When the tool is withdrawn completely from within the cushion, and the anchor is engaged with the corresponding securing plate, the ornament is positioned completely within the opening defined in the insert. The ornament also pulls the recess and the reinforcing element positioned over the opening downwardly, such that the recess and the reinforcing element generally conform to the shape of the opening. In this position, the ornament is located in a recessed position within the opening such that little, if any, of the head of the ornament is positioned above the upholstery cover on the upper surface of the cushion and such that the part of the recess pulled downwardly by the ornament gives a continuous appearance to the cover beneath the ornament. Also, due to the shape of the head of the ornament, its conformance to the shape of the openings in the insert, and the securing members on the head, the ornament cannot be rotated within the opening. After all of the ornaments are secured to the cushion within each opening, the cushion can also be secured to a frame using upholstery techniques common to motorcycle, automotive, off-highway, over-the-road truck seating, as well as furniture.

Objects of the present invention include: forming a cushion filler including a number of inserts formed of a relatively high-stiffness material positioned within the cushion filler, which is formed of a relatively low-stiffness material, to provide recessed mounting openings for upholstery ornaments; forming an upholstery cover for the cushion filler including a number of reinforcing elements sealed over recesses in the cover, including holes in the elements and recesses that are aligned with the openings in the inserts for receiving upholstery ornaments; providing upholstery ornaments including a head having an overall shape for the head complementary to the openings in the insert to provide a recessed and aesthetically pleasing appearance to the cushion including the ornaments and a stem having an open-ended slot in which a conventional ornament-retaining anchor can be easily connected, and a tapered end on the stem capable of easily penetrating into and/or through the openings in the inserts through the cover; and positioning or forming securing plates on the cushion filler opposite and in alignment with the inserts to effectively engage the anchors connected to the upholstery ornaments in order to affix the ornaments within the inserts without compressing the cushion filler.

BRIEF DESCRIPTION OF THE DRAWINGS

The above and other objects and features of the invention will become more readily apparent with reference to the detailed description which follows and to the accompanying drawings in which like reference numerals refer to like elements and in which.

DETAILED DESCRIPTION OF THE DRAWINGS

Figure 1:
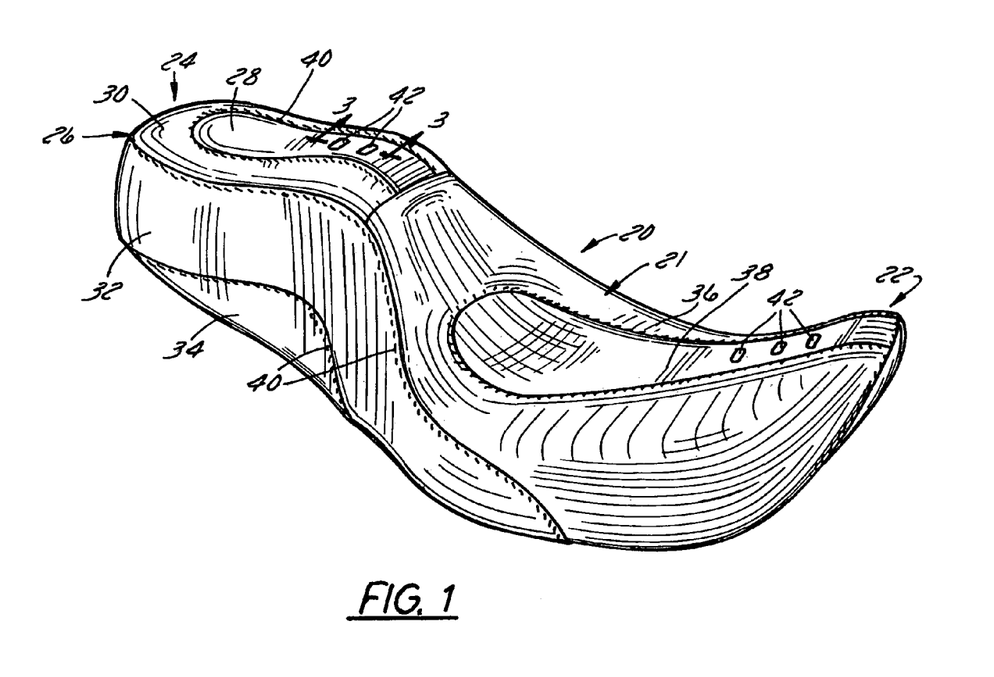
FIG. 1 is an isometric view of a motorcycle seat cushion constructed according the present invention.

With reference now to the drawing figures, a recessed cushion ornament embodiment illustrated as a seat cushion for a motorcycle is illustrated generally at 20 in FIG. 1. It is to be understood that while the cushion 20 illustrated is designed as a seat cushion for use with a motorcycle, the cushion and ornaments of the present invention can be utilized in a wide range of applications, such as in general motorcycle and automotive applications, off-highway applications, over-the-road truck applications, as well as general furniture and seating applications. The cushion 20 includes a seating surface 21 having a front seating portion 22 and a rear seating portion or pillion 24 that is elevated with respect to the front surface 22. Both the front portion 22 and rear portion 24 include an upholstery cover 26 formed of a number of various sections 28–38 of a suitable material which are secured to one another to form the cover 26. Sections 28–38 are preferably formed of a durable and water-resistant or waterproof material, such as treated or untreated leather, thermoformed vinyl, or a vinyl-coated fabric, among others, and can be attached to one or more adjacent sections 28–38 by any suitable means such as a number of fasteners, heat sealing or an adhesive, but are preferably attached to one another by stitching 40 extending along the borders between adjacent sections 28–38. The cover 26 can also be formed of a single section of material if desired.

Figure 4:
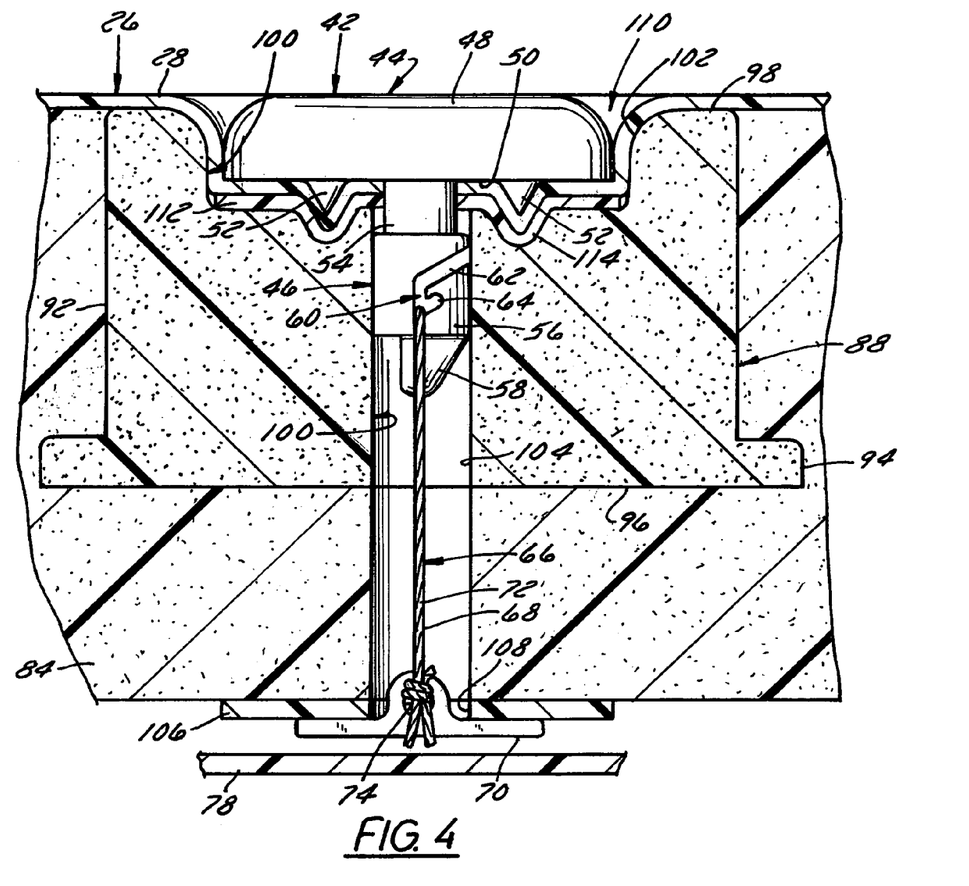
FIG. 4 is a partially broken away, cross-sectional view of the seat cushion of FIG. 3.
Figures 5, 7:
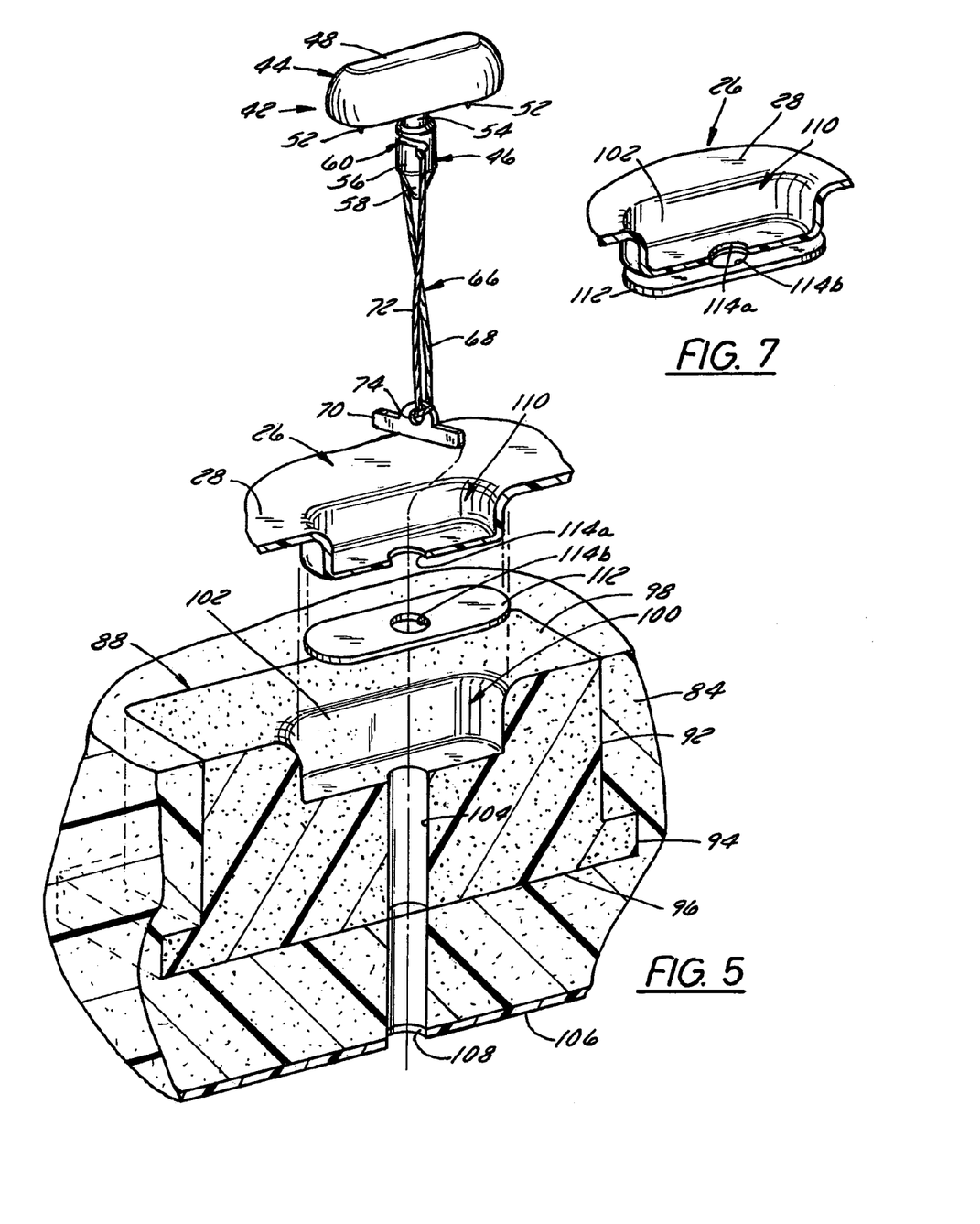
FIG. 5 is a partially broken away, exploded cross-sectional view of the seat cushion of FIG. 3.
FIG. 7 is a partially broken away, cross-sectional view of the upholstery cover and plug secured to the cover of the cushion of FIG. 5.
Figure 6:
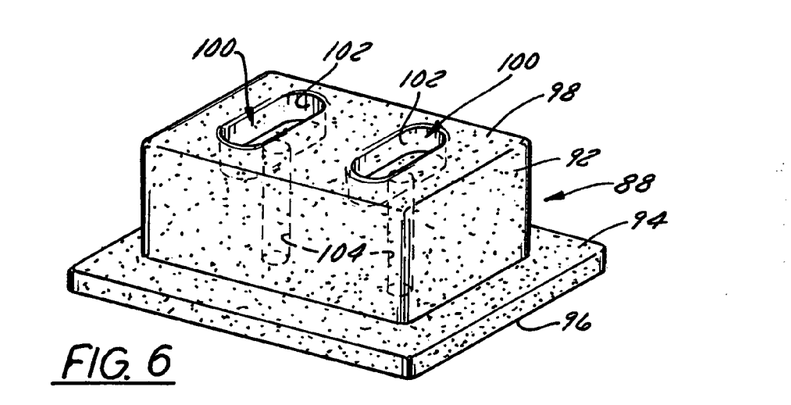
FIG. 6 is an isometric view of the high-density insert of the seat cushion of FIG. 5.
Figure 8:
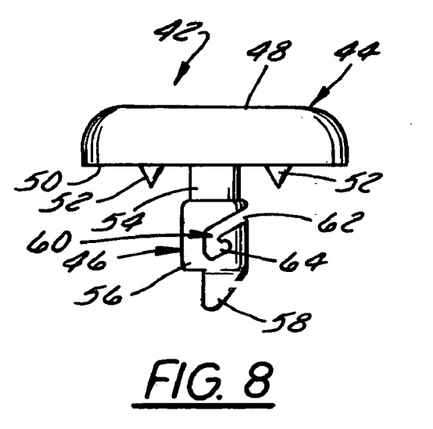
FIG. 8 is a front plan view of an upholstery ornament of the seat cushion of FIG. 5.
Figure 9:
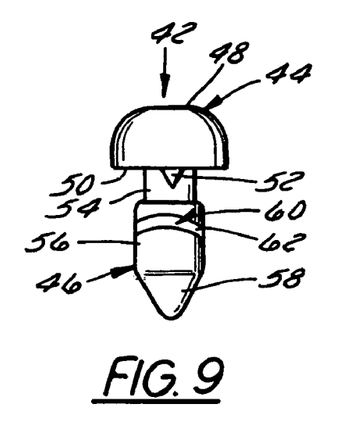
FIG. 9 is a left side plan view of the ornament of FIG. 8.

The seat cushion 20 also includes a number of upholstery ornaments 42 positioned on the front surface 22 and the rear surface 24. As best shown in FIGS. 4, 8 and 9, the ornaments 42 are formed of a generally rigid material, such as a plastic, including an acetal copolymer or nylon, or a metal, and preferably a zinc alloy, and each include an elongate head 44 from which extends a stem 46. The head 44 can have any shape desired but is in the embodiment illustrated generally oval in shape and includes a curved upper surface 48 and a lower flat surface 50. The flat lower surface 50 includes a pair of tangs or prongs 52 which are preferably frustoconical in shape and are disposed on opposite sides of the stem 46. The prongs 52 operate to assist in holding the ornaments 42 in a stationary position on the seat cushion 20 in a manner to be described.

Between the prongs 52, the stem 46 extends outwardly perpendicular to the flat surface 50, and includes an upper reduced diameter portion 54 and a lower enlarged diameter portion 56. Both the upper portion 54 and lower portion 56 are generally cylindrical in shape in order to facilitate the engagement of the stem 46 with the seat cushion 20. Further, in order to further facilitate this engagement, the lower portion 56 includes a tapered tip 58 that extends outwardly from the lower portion opposite the upper portion 54. Tip 58 is generally conical in shape, and extends only over a section of the area of the lower portion 56 to facilitate the expansion of an opening in the seat cushion 20 to more easily enable the stem 46 to be inserted into the cushion 20.

Looking at FIGS. 2–5 the lower portion 56 also includes an anchor notch 60 located between the upper portion 54 and the tip 58. The notch 60 includes an angled section 62 that extends from one side of the lower portion 56 into the stem 46 and a holding section 64 extending across the lower portion 56. The anchor notch 60 is engageable with a tie down or anchor 66 formed of a cord 68 and a tee member 70. The cord 68 can be formed of any conventional fibrous material used to form a string or a rope, but is preferably nylon, and is engaged with the anchor notch 60 opposite the tee member 70 by forming the cord 68 into a loop 72. The loop 72 is engaged with the notch 60 by inserting one end of the loop 72 through the angled section 62 of the notch 60 and positioning the loop 72 within the holding section 64. The tee member 70 is shaped as an elongated rigid member having a relatively thin cross-section and an eyehole or opening 74 disposed approximately in the center thereof. The end of the loop 72 opposite the notch 60 is engaged through the opening 74 in order to hold the tee member 70 on the cord 68, such as by tying the ends of the cord 68 through the opening 74 to form the loop 72. The anchor 66 is used to secure each ornament 42 to the seat cushion 20 in a manner which will be described.

Referring now to FIGS. 2–6, the seat cushion 20 is illustrated as being formed of a base 78, a cushion 80 positioned on the base 78, and the upholstery cover 26 secured to the base 78 around the cushion 80 or between the base 78 and the cushion 80. The base 78 is formed of a generally rigid material, such as a hard plastic, and includes a number of mounting features (not shown) that enable the base 78 to secure the seat cushion 20 to a motorcycle frame (not shown). Further, the upholstery cover 26 can be secured to the base 78 and/or the cushion 80 in any conventional manner used in vehicular or furniture upholstery applications, but in the embodiment illustrated is secured by the means of staples (not shown) inserted through the periphery of the cover 26 into the base 78 to permanently join cover 26, base 78 and cushion 80 to one another by forming a mechanical engagement between the cover 26 and the base 78 and cushion 80.

The cushion 80 is formed of an outer cushion filler 84, and a number of inserts 86 and 88 positioned within the cushion filler 84. The filler 84 is formed of a relatively low-stiffness, soft and conforming flexible material, such as a polyurethane foam, in order to provide adequate compressibility and comfort to an individual sitting on the seat cushion 20. The filler 84 is formed within a mold (not shown) into which the soft, flexible material is charged in order to form a cushion filler 84 having the desired shape for the overall seat cushion 20. The particular method used to form the cushion filler 84 can be any conventional molding process used to form soft and flexible materials, such as foams, into the desired shape.

Figure 2:
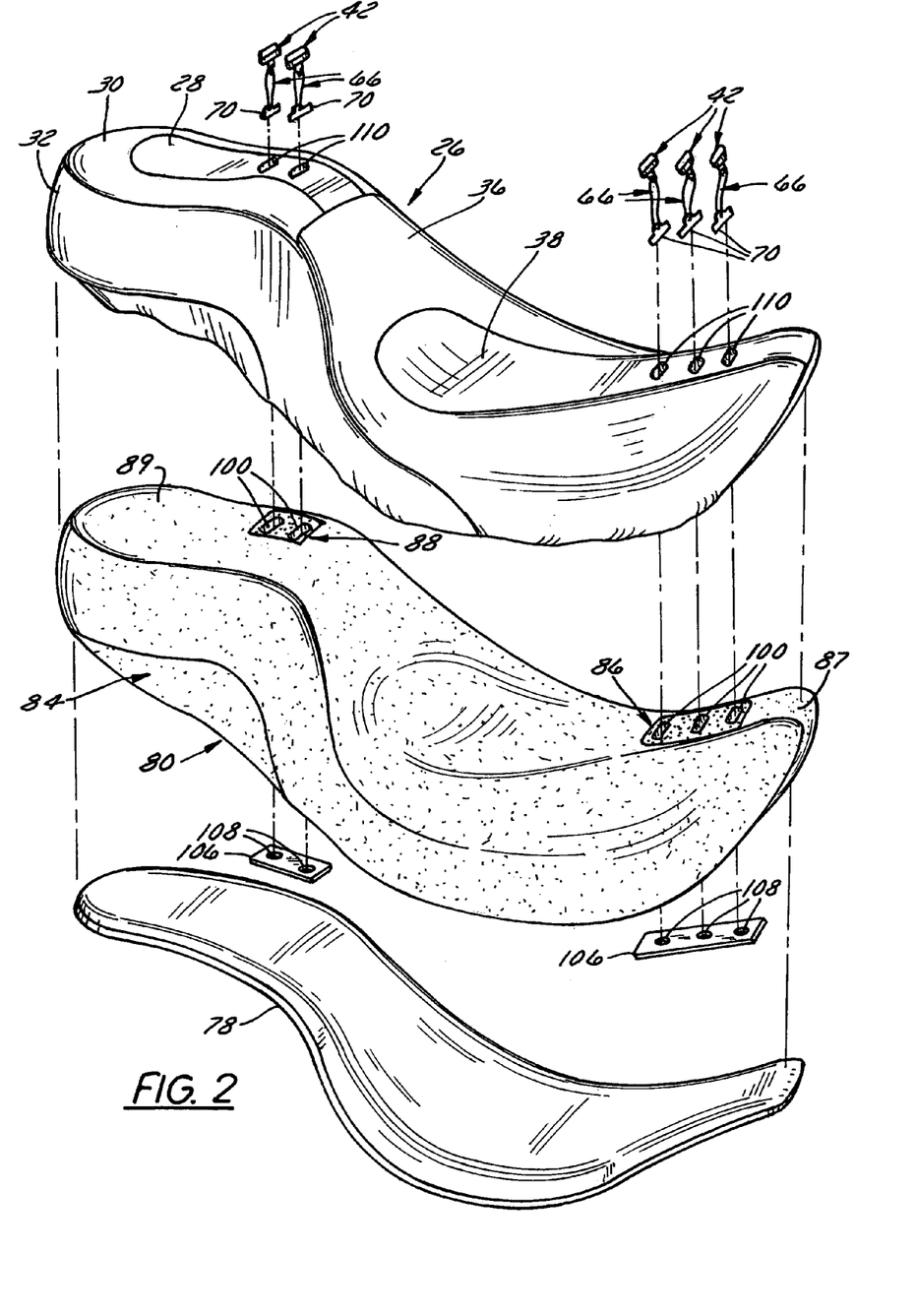
FIG. 2 is an exploded, isometric view of the seat cushion of FIG. 1.
Figure 3:
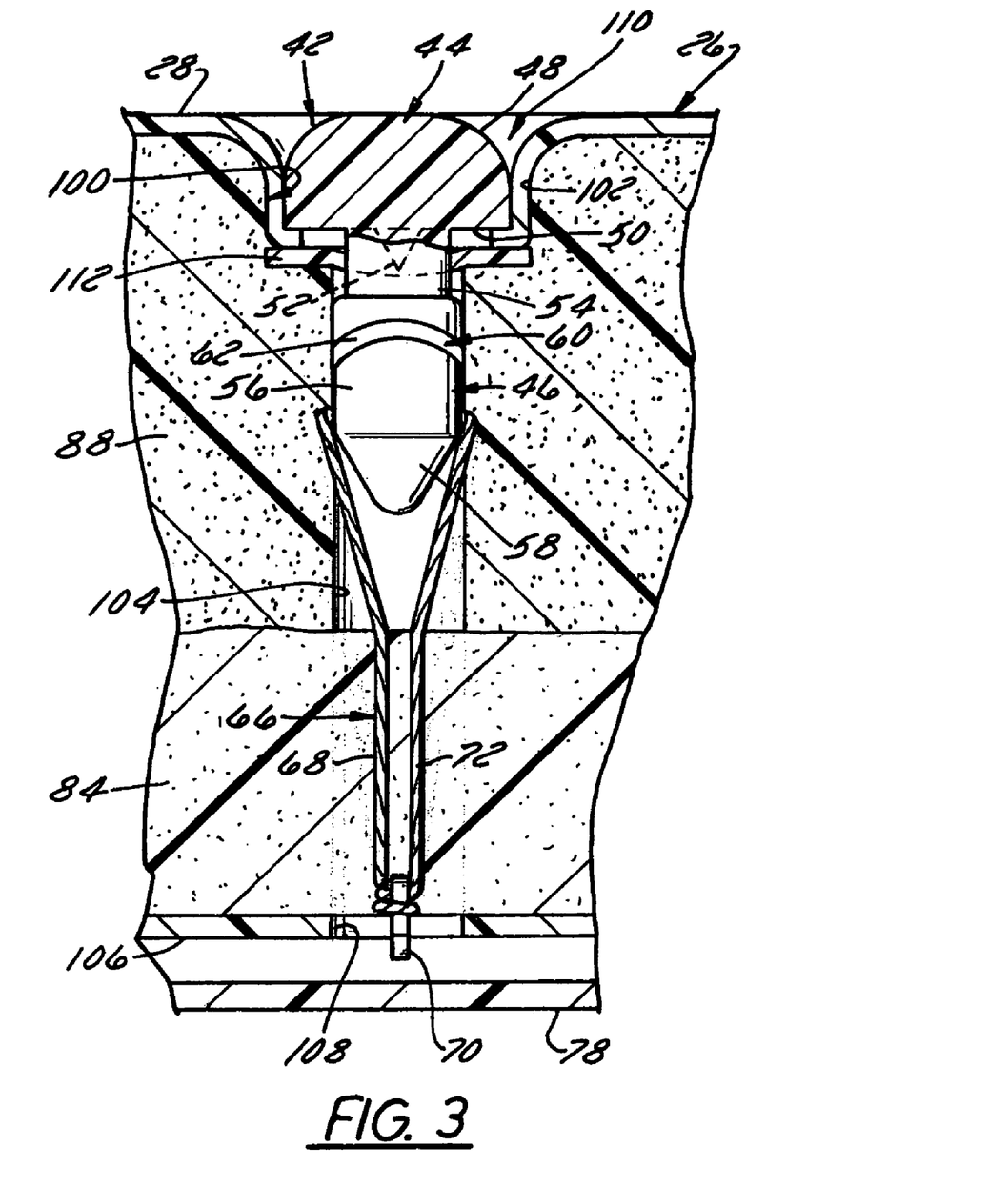
FIG. 3 is a partially broken away, cross-sectional view along line 3—3 of FIG. 1.

In a preferred embodiment, best shown in FIG. 2, the cushion filler 84 contains a first insert 86 positioned adjacent the forward end 87 of the cushion filler 84, and a second insert 88 positioned adjacent the rear end 89 of the cushion filler 84. Each of the inserts 86 and 88 positioned within the cushion filler 84 is formed separately from the cushion filler 84 of a relatively high-stiffness, flexible material having a stiffness 500% to 1000% greater than the low-stiffness material forming the cushion filler 84, that is preferably a foam, and most preferably a conventional polyurethane integral skin foam. The inserts 86 and 88 are formed in a separate molding process from that used to form the cushion filler 84, which can be any suitable process for forming inserts of these types of materials. The inserts 86 and 88 are formed consecutively or simultaneously in one of these processes to have a central member 92 and a peripheral flange 94 extending outwardly from one side of the central member 92. The central member 92 can be shaped as necessary to accommodate the shape of the ornaments 42, but is preferably formed to be generally rectangular in shape, with a flat lower surface 96 that is coextensive with the peripheral flange 94, and an upper surface 98 that conforms to the shape of the cushion filler 84 at the particular location where the inserts 86 and 88 are positioned to provide a generally continuous appearance to the cushion filler 84. The central member 92 also includes a number of openings 100 formed in the upper surface 98 and extending through the central member 92. The openings 100 can have any necessary shape based on the shape of the ornaments 42, but in a preferred embodiment are formed to have an elongate pocket or wide upper part 102 shaped similarly to the lower surface 50 of each ornament 42, and an elongate bore or narrow lower part 104 that has a generally circular cross-section similar to the stem 46 of each ornament 42. Also, the inserts 86 and 88 can be positioned on pins (not shown) in the mold (not shown) used to form the filler 84 around the inserts 86 and 88, the lower part 104 of each opening 100 is positioned in alignment with a hole 108 in a securing plate 106, to be described. The depth of the upper part 102 from the upper surface 98 of the central member 92 is determined such that only a small amount of the upper surface 48 of the ornament 42 protrudes above the upper part 102 of each opening 100 in order to provide the desired appearance for the ornaments 42 on the seat cushion 20.

In order to assist in securing each ornament 42 within the respective opening 100, the cushion 80 also includes a pair of securing plates 106 positioned on the cushion filler 84 directly beneath each insert 86 and 88. The securing plates 106 and inserts 88 and 86 can be retained on or within the cushion filler 84 in any suitable manner, such as by placing the plates 106 and inserts 86 and 88 within recesses formed in cushion 84 such that they do not need to be molded in place on the cushion filler 84. However, in a preferred embodiment, similarly to the process discussed previously for the inserts 86 and 88, the plates 106 are foamed in place within the cushion filler 84 to ease assembly of cover 26, cushion 80, and ornaments. Specifically, the securing plates 106 are positioned on pins (not shown) in the lid of the mold (not shown) used to form the filler 84. The filler 84 is then formed in the mold around the securing plates 106, such that the holes 108 in each plate 106 are positioned in alignment with the lower part 104 of each opening 100 of the inserts 86 and 88. The plates 106 are formed of a generally rigid material, such as a hard plastic, in order to provide rigid and secure attachment points for the anchors 66 of each ornament 42. Due to the positioning of the holes 108 beneath the openings 100, when the ornaments 42 are secured within the inserts 86 and 88 in the cushion filler 84 in a manner to be described, the tee member 70 of each anchor 66 can be pulled through and secured against both sides of each hole 108 to provide a secure attachment of the ornaments 42 to the cushion filler 84. Alternatively, the plates 106 may be omitted entirely, such that the openings 108 are formed directly in the base 78.

Looking now at FIGS. 1, 3–5 and 7, the cover 26 is formed such that the sections 28 and 38 positioned over the inserts 86 and 88 in the cushion filler 84 are formed with a number of recesses 110. Each recess 110 is connected to one of a number of reinforcing element 112 formed of the same material used to form the sections 28 and 38 and positioned directly beneath the recess 110. The reinforcing elements 112 are illustrated as being generally oval in shape, but can be made into any desired shape depending upon the shape of the recesses 110 and ornaments 42 to be positioned in the recesses 110. The reinforcing elements 112 are sealed to the sections 28 and 38 opposite the exposed surface for each section 28 and 38 by utilizing a conventional heat sealing mechanism (not shown) that forms the recesses and compresses and engages the reinforcing elements 112 against each of the recesses 110 while simultaneously piercing holes 114a and 114b through the recess 110 and the reinforcing element 112, respectively. By securing the reinforcing elements 112 beneath the recesses 110 in this manner and position, the reinforcing elements 112 provide additional strength and tear resistance to the recesses 110 in each section 28 and 38. Further, the punch (not shown) of the heat sealing mechanism used to affix the reinforcing elements 112 to the recess 110 includes a protrusion or pouch (not shown) that functions to form the holes 114a and 114b in the center of the recess 110 and reinforcing elements 112. The holes 114a and 114b are preferably circular in shape and have a diameter approximately equal to the diameter of the stem 46 of each ornament 42. When the cover 26 including the reinforcing elements 112 is secured to the cushion 80, the holes 114a and 114b are positioned within the upper parts 102 of the openings 100 in alignment with the lower parts 104 of the openings 100.

In order to assemble the seat cushion 20, initially the inserts 86 and 88 are formed of the high-stiffness, flexible material in a conventional molding process that provides inserts 86 and 88 with the openings 100 and flanges 94 and having the desired shape. The inserts 86 and 88 are then positioned on the pins located within a cavity or mold in which the cushion filler 84 is to be formed such that the inserts 86 and 88 and plates 106 are positioned at the desired locations within the mold. The mold is then injected with the low-stiffness, flexible material to form the cushion filler 84 around the inserts 86 and 88 and against the plates 106. Alternatively, as discussed previously, the inserts 86 and 88, and plates 106 can be positioned on the filler after the formation of the cushion filler 84 in any other conventional manner, such as by placing the inserts 86 and 88 and plates 106 within sockets (not shown) formed in the cushion filler 84 during molding.

After the securing plates 106 are secured to the cushion filler 84, the upholstery cover 26, which is formed as discussed previously to include the recesses 110 and the reinforcing elements 112 with the holes 114a and 114b, respectively, in a heat sealing method, can be positioned on the cushion filler 84 prior to the attachment of the base 78 to the cover 26 and filler 84 in order to form the cushion 80. When the cover 26 is positioned on the cushion 80, the recesses 110, reinforcing elements 112 and holes 114a and 114b are positioned directly over the openings 100 in each insert 86 and 88.

After the cover 26 and the cushion filler 84 are positioned against one another to form the seat cushion 80, each ornament 42 is engaged with an anchor 66 by inserting one end of the loop 72 formed on the anchor 66 within the anchor notch 60 in the stem 46. In one of the multiple conventional processes for engaging the ornament 42 with the cushion 80, a conventional ornament attachment tool (not shown) is then inserted upwardly through a hole 108 in one securing plate 106, through the cushion filler 84, through the opening 100 in the insert 86 or 88, and through the holes 114a and 114b in the recess 110 and reinforcing element 112 positioned over the opening 100. The tool is then engaged with the tee member 70 on the anchor 66 opposite the notch 60 such that the tee member 70 is oriented to pass through each of the holes 114a and 114b, opening 100, and hole 108. Once the tee member 70 is secured to the tool, the tool is withdrawn through the seat cushion 20 to draw the tee member 70 and cord 68 completely through the seat cushion 80 and to pull the stem 46 of the ornament 42 downwardly through the holes 114a and 114b and into and through the opening 100 in the insert 86 or 88.

When the tool is completely withdrawn from the seat cushion 20, the prongs 52 on the lower surface 50 of each ornament 42 engage the recesses 110 and reinforcing elements 112 on opposite sides of the holes 114a and 114b to pull the recesses 110 and reinforcing elements 112 downwardly into the associated opening 100, providing a continuous, recessed appearance for cover 26 as it extends beneath the ornament 42 within the opening 100. The prongs 52 also prevent the rotation of the ornament 42 within the opening 100, in conjunction with the complimentary shape of the upper part 102 of each opening 100. Subsequently, the tool adjusts the position of the tee member 70 such that the portions of the tee member 70 on opposite sides of the opening 74 are engaged with the securing plate 106 on opposite sides of the hole 108, thereby fixing the ornament 42 within the openings 100. This process is repeated for each ornament 42 to be positioned within an opening 100 in one of the inserts 86 or 88, in order to form the cushion 20 with the desired aesthetic appearance including the recessed ornaments 42.

Various alternatives are contemplated as being within the scope of the following claims particularly pointing out and distinctively the subject matter regarded as the invention.

We claim:

1. A cushion comprising:
  a) a first cushion insert formed of a flexible, relatively high-stiffness foam material and including an outer surface, a pocket formed in the outer surface, and an elongate bore extending therethrough that opens in the pocket;
  b) a cushion filler having an outer surface, the cushion filler being interlocked with and surrounding the cushion insert and formed of a foam material having a stiffness less than that of the cushion insert;
  c) a flexible cover overlying the outer surface of the cushion filler and overlying the outer surface of the cushion insert, the cover including a first hole therethrough that is generally aligned with the bore through the cushion insert;
  d) a first upholstery ornament disposed in the pocket in the cushion insert, the upholstery ornament having a head with a visible exterior surface that overlies the cover and a stem that extends from the head through the hole in the cover and into the elongate bore in the cushion insert;
  e) further comprising a securing plate engaged with a portion of the cushion filler that is disposed opposite the first cushion insert and including a slot aligned with the elongate bore in the first cushion insert and wherein the first upholstery ornament is anchored to the securing plate; and
  f) wherein the stem includes a notch spaced from the head and engageable with an anchor releasably secured within the notch and engaged with the securing plate; and
  g) wherein the notch in the stem of each ornament includes a holding portion positioned within each stem, and an angled portion extending from the holding portion to one side of the stem;
  h) wherein the hole in the cover is located within a recess formed in the cover that is received in the pocket formed in the cushion insert;
  i) wherein the ornament includes a number of prongs spaced from the stem and extending from the ornament, each prong engageable with the recess formed in the cover to prevent rotation of the ornament within the first opening.

2. The cushion of claim 1 wherein the pocket has a shape that is complementary to the head of the upholstery ornament.

3. The cushion of claim 1 wherein the first cushion insert is formed of a high-stiffness foam material having a stiffness of at least 500% greater than the stiffness of the low stiffness foam material used to form the cushion filler.

4. The cushion of claim 1 wherein the high-stiffness foam material is a polyurethane foam.

5. The cushion of claim 1 further comprising a second cushion insert formed of a flexible, relatively high-stiffness foam material that is interlocked with and surrounded by the cushion filler and that has an outer surface with a pocket formed therein that communicates with an elongate bore extending through the cushion insert, wherein the second cushion insert is spaced from the first cushion insert, and further comprising a second upholstery ornament overlying the cover and disposed in the pocket in the second cushion insert, the second upholstery head having a head with a visible outer surface and a stem that extends from the head through a second hole through the cover and that is received in the bore in the second cushion insert.

6. The cushion of claim 1 wherein the cushion filler is comprised of a polyurethane foam.

7. The seat cushion of claim 1 wherein the securing plate is foamed in place in the cushion filler.

8. The seat cushion of claim 1 wherein the anchor includes a cord having one end disposed within the notch and an opposite end engaged with a tee element, the cord received through the slot in the securing plate, and the tee element engaged with the securing plate to hold the upholstery ornament within the pocket in the cushion insert.

9. A cushion comprising:
a) a first cushion insert formed of a flexible, relatively high-stiffness foam material and including an outer surface, a pocket formed in the outer surface, and an elongate bore extending therethrough that opens in the pocket;
b) a cushion filler having an outer surface, the cushion filler being interlocked with and surrounding the cushion insert and formed of a foam material having a stiffness less than that of the cushion insert;
c) a flexible cover overlying the outer surface of the cushion filler and overlying the outer surface of the cushion insert, the cover including a first hole therethrough that is generally aligned with the bore through the cushion insert:
d) a first upholstery ornament disposed in the pocket in the cushion insert, the upholstery ornament having a head with a visible exterior surface that overlies the cover and a stem that extends from the head through the hole in the cover and into the elongate bore in the cushion insert;
e) wherein the hole in the cover is located within a recess formed in the cover that is received in the pocket formed in the cushion insert; and
f) wherein the ornament includes a number of prongs spaced from the stem and extending from the ornament, each prong engageable with the recess formed in the cover to prevent rotation of the ornament within the first opening.

10. The cushion of claim 9 further comprising a reinforcing element secured to the recess.

11. The seat cushion of claim 10 wherein the recesses and the reinforcing elements are heat-sealingly engaged with one another.

12. The seat cushion of claim 11 wherein the recesses and the reinforcing elements each include holes through which the stem of each ornament is inserted.

13. A seat cushion comprising:
a) a first insert formed of a flexible, relatively high-stiffness foam material and including a number of first openings extending therethrough;
b) a second insert formed of a flexible, relatively high-stiffness foam material having a number of second openings extending therethrough and spaced from the first insert;
c) a cushion filler interlocked with the first insert and the second insert and formed of a flexible, relatively low-stiffness foam material;
d) a cover overlying the cushion filler, the first insert and the second insert, the cover including a number of reinforcing elements having holes aligned with the first openings in the first insert and the second openings in the second insert;
e) a number of upholstery ornaments positioned in the first openings and second openings, each ornament including a stem inserted through the hole in one of the number of reinforcing elements and a head positioned above the one of the number of the reinforcing elements within the first openings and second openings in a recessed and non-rotatable position below an upper surface of the seat cushion; and
f) a pair of securing plates engaged with the cushion filler with one of the securing plates disposed opposite the first insert and the other one of the securing plates disposed opposite the second insert, each plate including a number of slots aligned with a plurality of the openings in its respective insert.

14. The seat cushion of claim 13 further comprising a base attached to the cover and the cushion filler opposite the ornaments that is securable to a frame.

15. A seat cushion comprising:
a seat base;
a seat cushion filler made of a foam that overlies the base and that has an outer surface disposed opposite the base;
a cushion insert disposed in the foam cushion filler, the cushion insert made of a foam that is stiffer than the foam of the cushion filler, the cushion insert having an outer surface that is substantially flush with the outer surface of the cushion filler, and the cushion insert having a three dimensionally contoured pocket formed in its outer surface;
an outer cover overlying the outer surface of the cushion filler and overlying the outer surface of the cushion insert, the outer cover having a recess formed therein that has a three dimensional contour substantially complementary to the three dimensional contour of the pocket in the cushion insert with the outer cover recess received in the pocket in the cushion insert; and
an upholstery ornament that is received and retained in the outer cover recess; and
wherein the upholstery ornament comprises a head received in the recess, the head having a bottom surface that overlies the recess the head having a plurality of spaced apart prongs extending outwardly from the bottom surface, each prong engaging the recess opposing rotation of the upholstery ornament relative to the outer cover.

16. The seat cushion of claim 15 wherein the head of the upholstery ornament comprises an oblong head, the recess is oblong-shaped, and the pocket is oblong-shaped.

17. The seat cushion of claim 15 further comprising a cord disposed in the cushion insert that is attached to the upholstery ornament and that is attached to an anchor.

18. The seat cushion of claim 17 wherein the anchor comprises a securing plate disposed adjacent the base to which the cord is anchored.

19. The seat cushion of claim 18 wherein the anchor further comprises a tee attached to the cord that engages the securing plate.

20. The seat cushion of claim 15 wherein the head of the upholstery ornament is received in the recess and has a stem that extends outwardly from the head through the recess and into the cushion insert.

21. The seat cushion of claim 20 wherein the stem has a pointed end and comprises a hook that is attached to an anchor that retains the upholstery ornament in the recess.

22. The seat cushion of claim 15 wherein the cushion filler surrounds the cushion insert and underlies the cushion insert.

23. A seat cushion comprising:

a seat base;

a seat cushion filler made of a foam that overlies the base and that has a seat occupant supporting outer surface disposed opposite the base;

a cushion insert embedded in the foam cushion filler, the cushion insert made of a foam that is stiffer than the foam of the cushion filler, the cushion insert having an outer surface capable of supporting a seat occupant thereon that is substantially flush with the seat occupant supporting outer surface of the cushion filler, and the cushion insert having a pocket preformed in its outer surface that has a sidewall and a bottom wall;

an outer cover overlying the outer surface of the cushion filler and overlying the outer surface of the cushion insert, the outer cover having a recess preformed therein that is defined by a sidewall and a bottom wall with the preformed outer cover recess received in the preformed pocket in the cushion insert;

an upholstery ornament that is received in the preformed outer cover recess, the upholstery ornament having a head with a bottom surface that overlies the bottom wall of the preformed outer cover recess, the bottom surface of the upholstery ornament having a plurality of projections that each engage the bottom wall of the preformed outer cover recess and oppose relative rotation between the head and the outer cover;

an anchor underlying the cushion insert that is attached to the upholstery ornament and which retains the upholstery ornament in the preformed outer cover recess; and wherein the outer surface of the foam cushion insert that is capable of supporting a seat occupant thereon extends outwardly beyond the outer periphery of the upholstery ornament.

24. A seat cushion comprising:

a seat cushion filler comprised of a foam and having an outer seat occupant supporting surface;

a seat cushion insert disposed in the foam seat cushion filler which surrounds it and holds it captive, the cushion insert comprised of a foam that is stiffer than the foam of which the cushion filler is comprised, the foam seat cushion insert having an outer surface that is substantially flush with the outer seat occupant supporting surface of the foam seat cushion filler, and the foam seat cushion insert having a pocket formed in its outer surface that is defined by a sidewall and a bottom wall;

an outer seat cover overlying the outer surface of the foam seat cushion filler and overlying the outer surface of the foam seat cushion insert, the outer seat cover having a heat-formed recess preformed therein that is defined by a sidewall and a bottom wall with the outer seat cover recess received in the pocket formed in the outer surface of the foam seat cushion insert;

an upholstery ornament that is received in the preformed outer seat cover recess, the upholstery ornament having a head that comprises (a) a bottom wall that overlies the bottom wall of the preformed outer seat cover recess and (b) a sidewall that is bounded by the sidewall of the preformed outer seat cover recess; and an upholstery ornament anchor attached to the upholstery ornament that retains the upholstery ornament in the outer cover recess.

25. A seat cushion comprising:

a seat cushion filler made of a foam and that has an outer seat occupant supporting surface;

a cushion insert disposed in the foam cushion filler, the cushion insert made of a foam that is stiffer than the foam of the cushion filler, the cushion insert having an outer surface capable of supporting a seat occupant adjoining the outer seat occupant supporting surface of the cushion filler, and the cushion insert having a preformed pocket disposed in its outer surface;

an outer cover overlying the outer surface of the cushion filler and overlying the outer surface of the cushion insert, the outer cover having a recess disposed therein that is received in the preformed pocket in the cushion insert;

an upholstery ornament that is received in the outer cover recess;

a reinforcing plate heat sealed to the outer cover recess and which underlies the upholstery ornament;

an upholstery ornament anchor that retains the upholstery ornament in the outer cover recess; and wherein the upholstery ornament further comprises a stem that extends outwardly therefrom and through the outer cover recess and through the reinforcing plate.

26. A seat cushion comprising:

a cushion insert having an outer surface with a pocket formed therein, the cushion insert comprised of a foam;

a cushion filler comprised of a foam having a stiffness less than that of the cushion insert, the cushion filler surrounding the cushion insert with the cushion filler having an outer surface that is flush with the outer surface of the cushion insert;

an outer cover overlying the outer surface of the cushion filler and overlying the outer surface of the cushion insert, the outer cover having a recess preformed therein having a three dimensional contour that is complementary to the pocket formed in the cushion insert and that is received in the pocket formed in the cushion insert;

an upholstery ornament having a head that is disposed in the preformed recess in the outer cover and the pocket in the cushion insert and having a stem that extends from the head into the cushion insert, the stem comprising a hook and having a pointed end; and an upholstery ornament anchor that that underlies the cushion insert and which is attached by a cord to the hook of the upholstery ornament stem.

* * * * *

UNITED STATES PATENT AND TRADEMARK OFFICE
CERTIFICATE OF CORRECTION

| | |
|---|---|
| PATENT NO. | : 7,065,809 B1 |
| APPLICATION NO. | : 10/431185 |
| DATED | : August 10, 2004 |
| INVENTOR(S) | : Niels Diffrient et al. |

Page 1 of 1

It is certified that error appears in the above-identified patent and that said Letters Patent is hereby corrected as shown below:

ON THE TITLE PAGE

Item (73) Assignee: Please correct the assignee to read as follows:

-- Milsco Manufacturing Company, A Unit Of Jason Incorporated --.

IN THE CLAIMS

CLAIM 1, column 8, line 52, after "insert" insert -- , --;

CLAIM 9, column 9, line 50, delete " : " and substitute therefore -- ; --;

CLAIM 15, column 10, line 63, after "recess" insert -- , --;

CLAIM 26, column 12, line 61, delete "that" 2$^{nd}$ occurrence.

Signed and Sealed this

Fourteenth Day of November, 2006

JON W. DUDAS
*Director of the United States Patent and Trademark Office*

UNITED STATES PATENT AND TRADEMARK OFFICE
CERTIFICATE OF CORRECTION

PATENT NO.        : 7,065,809 B1
APPLICATION NO. : 10/431185
DATED             : June 27, 2006
INVENTOR(S)      : Niels Diffrient et al.

It is certified that error appears in the above-identified patent and that said Letters Patent is hereby corrected as shown below:

ON THE TITLE PAGE

Item (73) Assignee: Please correct the assignee to read as follows:

-- Milsco Manufacturing Company, A Unit Of Jason Incorporated --.

IN THE CLAIMS

CLAIM 1, column 8, line 52, after "insert" insert -- , --;

CLAIM 9, column 9, line 50, delete " : " and substitute therefore -- ; --;

CLAIM 15, column 10, line 63, after "recess" insert -- , --;

CLAIM 26, column 12, line 61, delete "that" 2$^{nd}$ occurrence.

This certificate supersedes Certificate of Correction issued November 14, 2006.

Signed and Sealed this

Second Day of January, 2007

JON W. DUDAS
*Director of the United States Patent and Trademark Office*